(12) United States Patent
Lange et al.

(10) Patent No.: US 7,042,572 B2
(45) Date of Patent: May 9, 2006

(54) FIBER OPTIC SENSING COIL WITH ISOTROPIC PROPERTIES

(75) Inventors: Charles H. Lange, Glendale, AZ (US); Michael M. Malkin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 386 days.

(21) Appl. No.: 10/668,189

(22) Filed: Sep. 24, 2003

(65) Prior Publication Data

US 2005/0062977 A1    Mar. 24, 2005

(51) Int. Cl.
*G01C 19/72* (2006.01)

(52) U.S. Cl. ........................... 356/465; 242/174
(58) Field of Classification Search ............... 356/460, 356/465, 483; 250/227.19, 227.27; 385/12, 385/123, 128; 242/159, 160.1, 166, 174, 242/178
See application file for complete search history.

(56) References Cited

U.S. PATENT DOCUMENTS

| | | | | |
|---|---|---|---|---|
| 4,743,115 A | * | 5/1988 | Arditty et al. | 242/445.1 |
| 5,179,613 A | * | 1/1993 | Cronk | 385/128 |
| 5,245,687 A | * | 9/1993 | Usui | 356/465 |
| 5,351,900 A | * | 10/1994 | Torney | 356/465 |
| 5,371,593 A | | 12/1994 | Cordova et al. | |
| 5,767,970 A | | 6/1998 | Cordova | |
| 5,841,932 A | * | 11/1998 | Page et al. | 385/123 |
| 5,870,194 A | | 2/1999 | Cordova et al. | |
| 6,215,933 B1 | | 4/2001 | Rahn | |

FOREIGN PATENT DOCUMENTS

WO    WO099/27321 A    6/1999

OTHER PUBLICATIONS

PCT International Search Report—PCT/US2004/031337, International Search Authority—EP Office, Mar. 30, 2005, 7 pages.
Patent Abstracts of Japan, vol. 016, No. 355 (P-1394), Jul. 30, 1992 & JP 04107508A (Fujikura Ltd.), Apr. 9, 1992.
Patent Abstracts of Japan, vol. 2003, No. 03, May 5, 2003 & JP2002341153A (Sumitomo Electric Ind Ltd.), Nov. 27, 2002.
Patent Abstracts of Japan, vol. 016, No. 536 (P-1449), Nov. 6, 1992 & JP 04203929A (Matsushita Electric Ind Co Ltd), Jul. 24, 1992.

* cited by examiner

*Primary Examiner*—Samuel A. Turner
(74) *Attorney, Agent, or Firm*—Kurt A. Luther

(57) ABSTRACT

A fiber optic sensing coil is formed by winding a non-coated optical fiber in a substantially circular loop. The non-coated optical fiber includes a core and a cladding. Once the non-coated optical fiber is wound, turns of the non-coated optical fiber are fused so that the cladding of the individual turns of the optical fiber are fused to one another at points of mutual contact.

14 Claims, 3 Drawing Sheets

FIBER OPTIC SENSING COIL WITH ISOTROPIC PROPERTIES

BACKGROUND

1. Field of the Invention

The present invention relates generally to a fiber optic sensing coil. More particularly, the present invention relates to a fiber optic sensing coil that reduces measurement error, increases LD product (a product of the length and diameter of the coil) for the same volume, improves LD stability, and simplifies manufacturing processes.

2. Background of the Invention

A fiber optic sensing coil is commonly used in fiber optic rotation sensing devices, such as an interferrometric fiber optic gyroscope (IFOG). As is well-known, the fiber optic sensing coil is a continuous optical fiber wound in a circular or looped shape that acts as a sensing device to detect a Sagnac phase difference for two counter-propagating beams in presence of rotation.

FIG. 1 shows a conventional optical fiber. As shown, optical fiber 10 typically consists of three main elements. A core 12 is a central section of the optical fiber and is the light transmitting region of the fiber and is usually made of silica. A cladding 14 is an optical region that surrounds core 12 and is usually made of silica or hard clad silica materials. Finally, a coating 16 that has non-optical properties surrounds cladding 16. Coating 16 protects the silica structure (i.e., the core and the cladding) from physical and environmental damages. Typically, coating 16 includes one or more layers of a polymer composition.

FIG. 2 shows a cross sectional view of a portion of a conventional fiber optic sensing coil. The sensing coil includes a continuous optical fiber 22 wound upon a supportive spool 24. The windings of optical fiber 22 are potted within a matrix of adhesive bonding material 26.

FIG. 3 shows an enlarged view of a portion of the wound coil taken at region 3 of FIG. 2. As shown, optical fiber 22 includes a core 30, a cladding 32 around core 30 and a coating 34 around cladding 32. As mentioned earlier, typically, core 30 is made of silica, cladding 32 is made of silica or hard clad silica material, and coating 34 is made of one or more layers of a polymer composition.

Many factors affect performance of a sensing coil, thereby affecting performance of a sensing device. For example, the product of the length and diameter (LD product) of the wound fiber optic sensing coil affects the sensitivity of a sensing device. Generally speaking, the greater the LD product, the greater the sensitivity and stability of the sensing device, and the lower the random noise. However, large coil volume resulting from greater fiber length or larger loop diameter (to achieve a higher LD product) requires increasingly bulky packages for the sensing device.

Also, as is well known, when the core material has different physical properties as compared to the coating material of the optical fiber, anisotropic thermal stresses can be induced in the sensing coil, thereby introducing a bias error. Further, environmental factors, including variables such as temperature, vibration (acoustical and mechanical) and magnetic fields, can affect the measured phase shift difference between the counter-propagating beams, thereby introducing a further bias error.

In attempts to reduce the bias errors introduced by such factors, and thereby enhance the accuracy of the sensing devices, various symmetric coil winding configurations have been proposed. For example, U.S. Pat. No. 4,793,708 (Fiber Optic Sensing Coil), which is incorporated herein by reference, teaches a symmetric fiber optic sensing coil formed by dualpole or quadrupole winding, and U.S. Pat. No. 6,215,933 (Bifilar FOG Coil Winding Pattern with Improved Shupe Bias Canceling Properties), which is incorporated herein by reference, teaches a bifilar coil winding method. The bifilar coil winding method employs two identical parallel fibers, each one-half the length of the final coil wound between first and second spools so that the respective midpoint of each fiber is located between the two spools. Both parallel fibers are then wound to form a coil using the quadrupole or dipole winding technique.

However, while the advantages of symmetric windings are recognized, this desirable arrangement has proven difficult to realize and there continues to be a need to improve the performance of sensing coils.

BRIEF SUMMARY OF THE INVENTION

The present invention provides an improved fiber optic sensing coil (herein also referred to as a sensing loop) that reduces measurement error, increases LD product for the same volume, improves LD stability, and simplifies the manufacturing process of a sensing coil. The fiber optic sensing coil of the present invention may be used in sensing devices, such as a fiber optic gyroscope.

The fiber optic sensing coil of the present invention is formed with a non-coated optical fiber. In contrast to a conventional optical fiber, the non-coated optical fiber does not include a coating made of polymer composition around the cladding. That is, the non-coated optical fiber employed in the present invention consists essentially of a core and cladding. The non-coated optical fiber is preferably made from uniform materials with isotropic properties. Once the non-coated optical fiber is wound, the claddings of turns of the non-coated optical fiber are fused to one another at points of mutual contact.

The sensing coil of the present invention may be formed by winding the non-coated optical fiber in one direction, clock wise or counter clock wise, in a simple pattern in one coil and fused together during the sensing coil manufacturing process. Alternatively, the non-coated optical fiber may be wound on a pair of spools in two directions, clock wise and counter clock wise, in a simple pattern, then wound to form a coil. The wound coil is fused together by heating during the sensing coil manufacturing process, resulting in substantial isotropic properties for the entire sensing coil.

The isotropic properties of the fiber optic sensing coil significantly lower measurement error in bias stability and scale factor. Further, the sensing coil of the present invention can be wound in a simple pattern since the anisotropic thermal stresses due to different properties of the fiber optic core and coating materials do not exist. Furthermore, by utilizing non-coated optical fiber, the sensing coil of the invention increases the LD product for the same volume.

DETAILED DESCRIPTION OF THE INVENTION

Reference will now be made in detail to the preferred embodiments of the present invention, examples of which are illustrated in the accompanying drawings.

Figure 1:
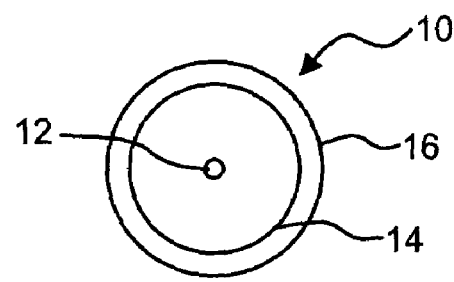
FIG. 1 is a cross-sectional view of a conventional optical fiber.
Figure 2:
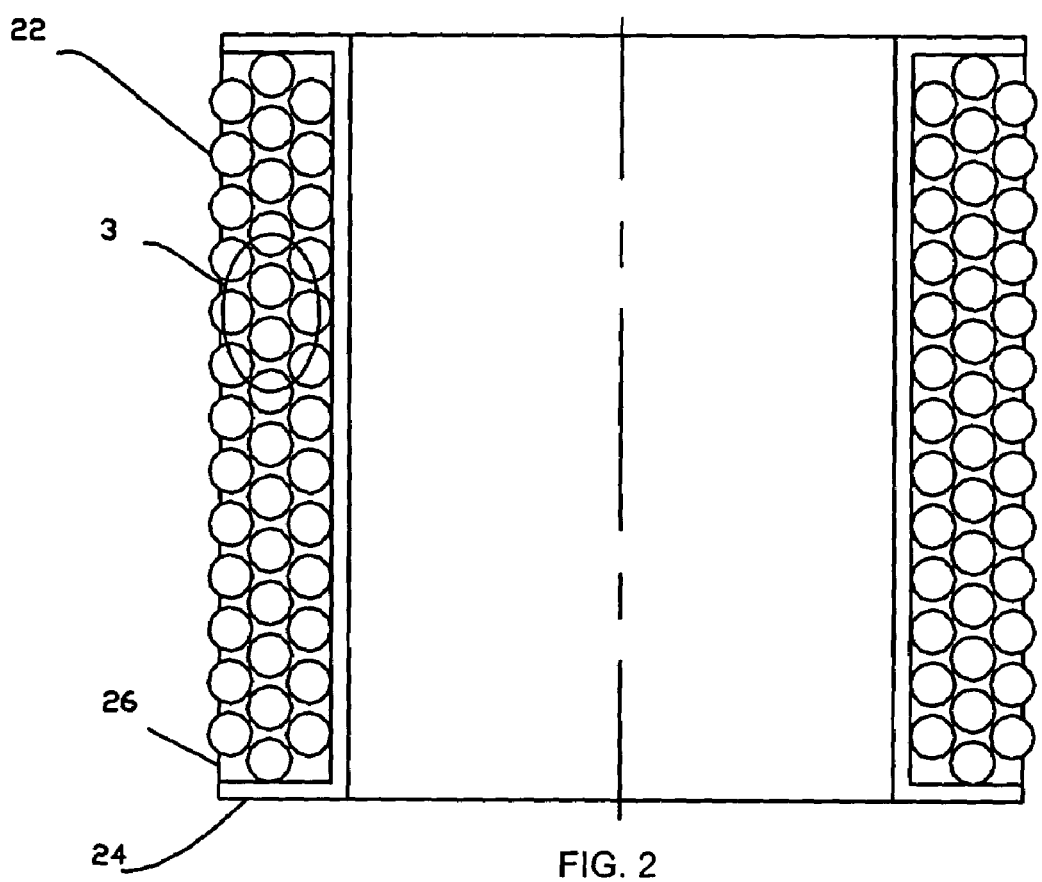
FIG. 2 is a cross-sectional view of the layered windings of a sensing coil in accordance with the prior art.
Figure 3:
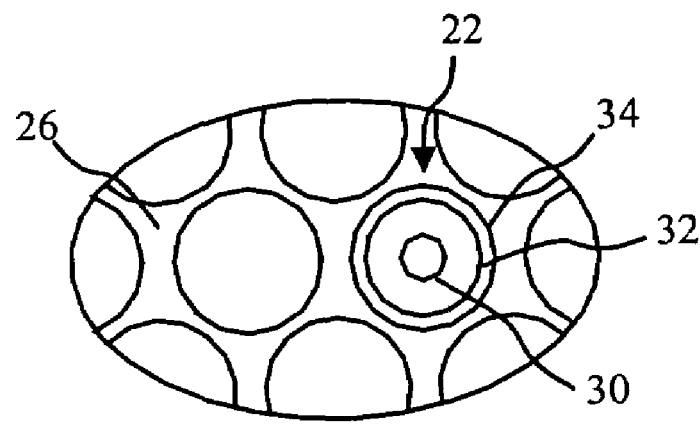
FIG. 3 is an enlarged view of a portion of the wound sensing coil taken at region 3 of FIG. 2.
Figure 4:
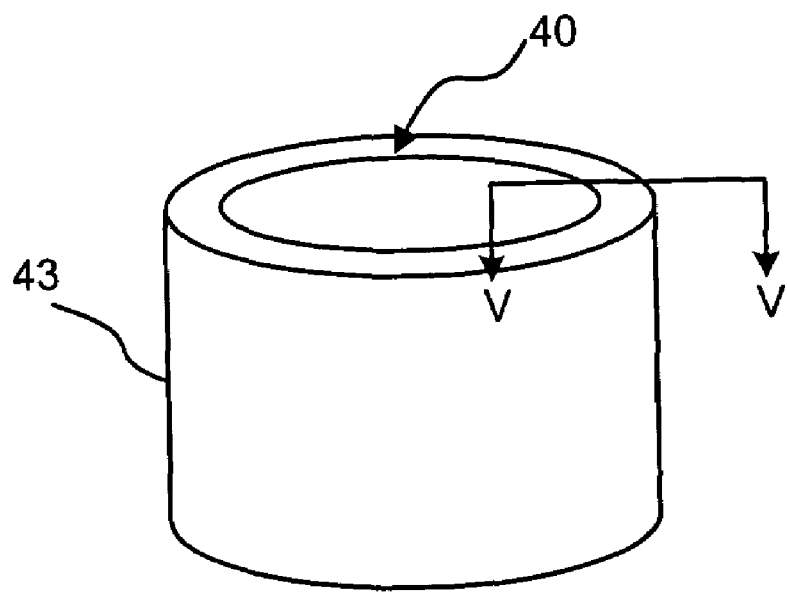
FIG. 4 is a perspective view of a sensing coil according to a preferred embodiment of the present invention.

FIG. 4 shows a perspective view of a fiber optic sensing coil 40 in accordance with the present invention. As mentioned earlier, fiber optic sensing coil 40 provides a critical element for sensing devices, such as a fiber optic gyroscope. In use, it is fixed to a platform whose rotation rate is to be measured. Sensing coil 40 is a particular example of a coil in accordance with the present invention. Sensing coil 40 includes a continuous non-coated optical fiber 43 that is wound in a circular or looped shape that serves as an optical guide for receiving a pair of counter-propagating beams emitted from a common light source in a fiber optic gyroscope. In contrast to conventional optical fiber, non-coated optical fiber 43 does not include a coating typically made of a polymer composition. Non-coated optical fiber 43 only includes a core and a cladding. To obtain such fiber, conventional optical fiber can be stripped of its coating. The non-coated optical fiber of the present invention is preferably made from uniform materials with isotropic properties. Non-coated optical fiber 43 may be wound upon a supportive spool including a pair of end flanges (not shown) during the sensing loop manufacturing process.

Figure 5:
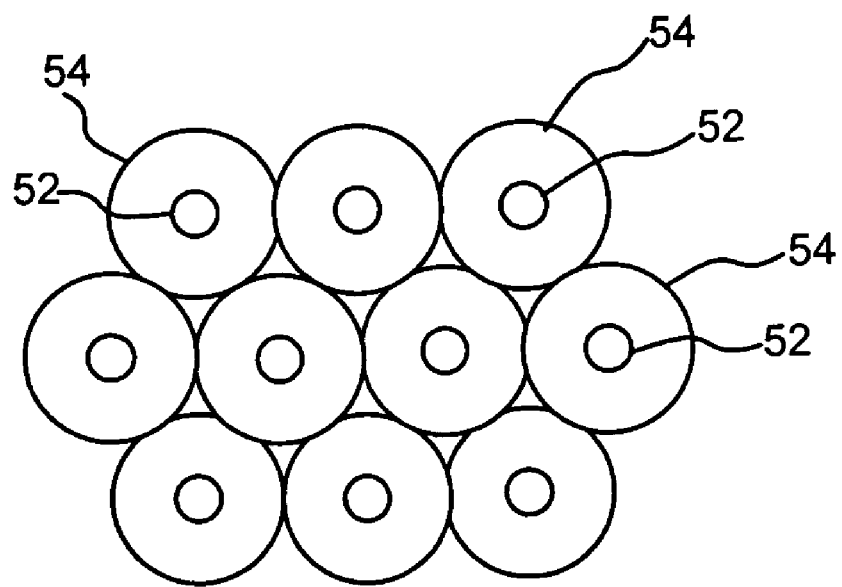
FIG. 5 is an enlarged cross sectional view of a portion of the sensing coil taken at line V—V of FIG. 4 according to a preferred embodiment of the present invention.

FIG. 5 shows an enlarged cross-sectional view of a portion of the wound coil taken at line V—V of FIG. 4 of fiber optic sensing coil 40 of the present invention. As shown, non-coated optical fiber 43 includes a core 52, which is the light transmitting region of the optical fiber and a cladding 54 around core 52. The core is typically made of silica. The cladding is typically made of silica or hard clad silica material. Once non-coated optical fiber 43 is wound, turns of the non-coated optical fiber are fused to one another at points of mutual contact. Specifically, the claddings of the turns of the non-coated optical fiber are fused to one another at points of mutual contact, as shown in the FIG. 5.

Figure 6:
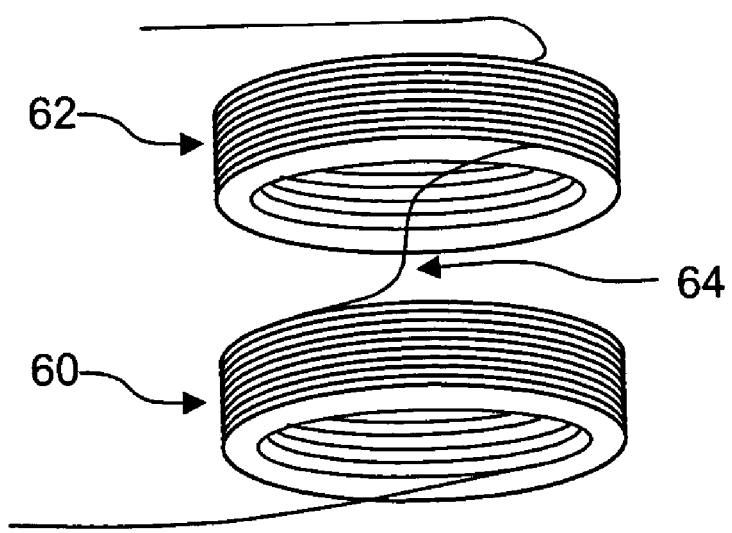
FIG. 6 is a perspective view of an optical fiber wound in two directions according to a preferred embodiment of the present invention.

The sensing coil of the present invention may be formed by winding the non-coated optical fiber in one direction, clock wise or counter clock wise, in a simple pattern in one coil and fusing the fiber strands together by applying heat. Alternatively, the non-coated optical fiber may be wound in two directions, clock wise and counter clock wise, in a simple pattern and fused together. FIG. 6 shows a non-coated optical fiber wound in clock wise and counter clock wise directions, forming a coil 60 and a coil 62, respectively. Coil 60 and coil 62 are than joined (or spliced) at a center of the sensing coil. The optical fiber near the center of the sensing coil may correspond to the optical fiber on outer layers of the coils. The inner layers of the coils may correspond to the optical fiber farthest away from the center of the sensing coil. Alternatively, the optical fiber near the center of the sensing coil may correspond to the optical fiber on the inner layers of the coils. The outer layers of the coils may correspond to optical fiber farthest away from the center of the sensing coil. Other winding configurations may be used. Heat to fuse the stands of fiber may be applied to the coil windings as the non-coating optical fiber is being wound upon a spool or after the completion of winding, or a combination of these techniques.

In a conventional sensing coil, a difference in temperature expansion rates of a coating material and a cladding causes a build-up of internal stresses in an optical fiber during any change of the optical fiber temperature from a stress-free reference temperature. A time dependent change of axial stresses in a longitudinal element of the optical fiber subjected to varying temperature are defined as follows:

$E_i$—Young's Modulus
$\alpha_i$—Coefficient of Thermal Expansion
$A_i$—Cross-sectional Area
$N_i$—Normal (Axial) Stress
$\tau$—Time
$\delta N_i/\delta\tau$—Change Rate (Time Derivative) of Normal (Axial) Stress
$\delta T/\delta\tau$—Change Rate (Time Derivative) of Temperature
$i$=1 glass cladding
$i$=2 plastic coating Stress in glass cladding:

$$\delta N_1/\delta\tau=[(\alpha_2-\alpha_1)*E_1*E_2*A_2/(E_2*A_2+E_1*A_1)]*\delta T/\delta\tau$$

Stress in plastic coating (negative sign means a compressive load):

$$\delta N_2/\delta\tau=[(\alpha_1-\alpha_2)*E_1*E_2*A_1/(E_2A_2+E_1*A_1)]*\delta T/\delta\tau$$

The elimination of interaction of the optical portion of the fiber (i.e., cladding) and the coating improves the overall stability of the sensing coil. This is a direct result of isotropic properties of the sensing coil. That is, the sensing coil expands with temperature at the same rate in all directions. For example, consider a conventional single loop of optical fiber consisting of a coating which expands at rate of X ppm/° C. and a glass cladding which expands at a rate of less than 1 ppm/° C. Since the coating expands X time faster than the glass cladding, the coating tries to stretch the glass cladding, thus inducing a stress to the optical fiber. The problem becomes much more complex when multiple loops of optical fiber are formed into a solid coil. The coating will expand much faster than the glass in a situation where the optical fiber is constrained by the adjacent optical fibers. The interaction between the coating and glass cladding can apply significant amount of stress to the optical fiber. In contrast, in the present invention which employs a non-coated optical fiber, a single loop of an optical fiber can expand unconstrained without being stressed. Even when multiple loops are formed into a coil, the optical fiber can expand unconstrained since the coil consist of a single material it expands in isotropic manner and the optical fiber is not stressed.

To summarize, the sensing coil of the present invention is preferably formed with non-coated optical fiber with isotropic properties. The isotropic properties of the fiber optic sensing coil provide significantly lower measurement error in bias stability and scale factor, thereby enhancing the accuracy of the sensing devices. Further, use of complex winding configurations to compensate for induced anisotropic thermal stresses is not needed, thereby simplifying the manufacturing process.

Additionally, since bonding material and fiber polymer coating are not used, the volume of the sensing coil can be reduced. Furthermore, by using non-coated optical fiber, in comparison with using the conventional coated optical fiber, the LD product of the sensing coil is increased for the same volume, thereby increasing the stability of the sensing device.

As mentioned earlier, the fiber optic sensing coil of the present invention may be used in a fiber optic gyroscope and similar optical devices.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fiber optic sensing loop, comprising:
   a predetermined length of optical fiber, the optical fiber having a core and a cladding,
   wherein the predetermined length of optical fiber is wound in a substantially circular pattern, successive turns of the optical fiber being in contact with one another, and
   wherein at least portions of cladding of the optical fiber that are in contact with each other are fused together thereby forming a substantially integral optical fiber sensing loop.

2. The fiber optic sensing loop of claim 1, wherein the successive turns of the optical fiber are arranged in one direction.

3. The fiber optic sensing loop of claim 1, wherein the successive turns of the optical fiber are arranged in two directions.

4. The fiber optic sensing loop of claim 1, wherein the system exhibits isotropic properties.

5. A fiber optic sensing coil, comprising:
   an optical fiber including a core and a cladding around the core,
   wherein the optical fiber is wound into a plurality of concentric cylindrical layers, each of the layers including a plurality of turns of the optical fiber, and cladding of the optical fiber in the plurality of concentric cylindrical layers and cladding of the optical fiber in the plurality of turns are fused to one another at points of mutual contact.

6. The fiber optic sensing coil of claim 5, wherein the optical fiber is wound in one direction.

7. The fiber optic sensing coil of claim 5, wherein the optical fiber is wound in two directions.

8. A method for manufacturing a fiber optic sensing coil, comprising:
   winding a predetermined length of optical fiber in a substantially circular pattern such that successive turns of the optical fiber are in contact with one another, the optical fiber having a core and a cladding, and
   fusing the optical fiber so that at least portions of cladding of the optical fiber that are in contact with one another are fused together thereby forming a substantially integral optical fiber sensing loop.

9. The method of claim 8, wherein the method further includes removing a coating of the optical fiber.

10. The method of claim 8, wherein the optical fiber is wound in one direction.

11. The method of claim 8, wherein the optical fiber is wound in two directions.

12. A method for manufacturing a fiber optic sensing coil, comprising:
   removing a coating made of a polymer composition from an optical fiber including a core, a cladding and the coating;
   winding a predetermined length of the optical fiber in a substantially circular pattern, wherein successive turns of the optical fiber are in contact with one another; and
   fusing the cladding of the successive turns of the optical fiber to one another at points of mutual contact.

13. The method of claim 12, wherein the optical fiber is wound in one direction to form a coil.

14. The method of claim 12, wherein the optical fiber is wound in two directions.

* * * * *